(12) United States Patent
Bell

(10) Patent No.: US 6,888,934 B2
(45) Date of Patent: May 3, 2005

(54) VEHICLE INTERCOM SYSTEM

(75) Inventor: Joseph A. Bell, Markle, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 148 days.

(21) Appl. No.: 10/346,997

(22) Filed: Jan. 17, 2003

(65) Prior Publication Data
US 2004/0141603 A1 Jul. 22, 2004

(51) Int. Cl.⁷ ................................................ H04M 9/00
(52) U.S. Cl. .......................... 379/167.01; 379/167.04; 379/167.06; 455/99; 455/96
(58) Field of Search ....................... 379/167.01, 167.02, 379/167.03, 167.04, 167.05, 167.06, 167.07; 455/90, 95, 98, 99, 96

(56) References Cited

U.S. PATENT DOCUMENTS

| 4,214,266 A | 7/1980 | Myers |
| 5,808,661 A | 9/1998 | Infiesto et al. |
| 6,181,707 B1 | 1/2001 | Erickson et al. |
| 6,421,081 B1 | 7/2002 | Markus |
| 2003/0095688 A1 * | 5/2003 | Kirmuss ..................... 382/105 |

* cited by examiner

Primary Examiner—Rexford Barnie
(74) Attorney, Agent, or Firm—Jeffrey P. Calfa; Dennis Kelly Sullivan; Susan L. Lukasik

(57) ABSTRACT

A vehicle intercom system allows conversation between individuals located, respectively, inside and outside of a vehicle. The voice units are linked by a vehicle controller area network eliminating the need for independent wiring of an intercom system.

9 Claims, 3 Drawing Sheets

VEHICLE INTERCOM SYSTEM

BACKGROUND OF THE INVENTION

1. Field of the Invention

The present invention relates generally to an intercom system for motor vehicles and more particularly to an intercom system implemented over a vehicle's controller area network and providing the ability for occupants of the vehicle to talk to individuals outside of, but near to, the vehicle.

2. Description of the Problem

Medium duty trucks are often employed in local delivery service, as wreckers, as garbage collection vehicles and for other types of service, where laborers work in close proximity to the vehicle while it is moving. Under these circumstances there can be a need for a worker to talk or otherwise communicate with the driver from outside the vehicle. Communication can take the form of shouts and hand waving, which can be missed or easily misunderstood by a driver.

Intercom systems have been used to provide for voice communication between persons in different rooms of a building where direct interaction is inconvenient but there exists a need for quick and easy conversation. Such systems are also found on aircraft. Most such intercom systems have used a wiring system dedicated to the use of the intercom system. A disadvantage of applying such systems to trucks would be the need to provide wiring. Wiring for power and control functions on a vehicle has been implemented using a vehicle harness which bundles the wires together in pre-measured lengths to simplify building the vehicle. Adding wiring to the harness requires modification of the harness, increasing the harness's complexity and cost. Installing a wiring system outside of the harness defeats the purpose of having a harness and could require modification of the vehicle to take additional mounting points and to provide routing for the wire.

However, contemporary vehicles increasingly rely on computer networks to handle vehicle control functions. Inputs from dash controls are routed from the dash board to controllers and digital data are exchanged between component vehicle controllers such as an engine controller and a transmission controller over a bus. Vehicle data networks are well known in the art and are described in standards published by the Society of Automotive Engineers (SAE) as part of the SAE J1708 and J1939 standards.

The SAE J1939 standard is a specialized application of a controller area network (CAN) to motor vehicles. The SAE J1939 standard provides an open protocol defining formats for particular types of messages, but also allows for development of proprietary message types. A message on a controller area network is not routed to a node based on a node address, but rather broadcast to all of the nodes connected to the network. Every CAN message includes a priority and an indication of the message contents. The remaining nodes on the system determine in accord with their own programming whether to act on a message or discard it. Data transmission is serial. Priority determines control of the network in cases of contention in access. Messages are small, at most eight bytes, and are protected by checksum error detection.

Use of a network to route control signals promises greater physical simplicity through displacing much of the vehicle wiring harness, reducing manufacturing costs, facilitating vehicle electrical load management, and enhancing system reliability. Serial data bus communication is effective for eliminating dedicated communication paths between the numerous switches, sensors, devices and gauges installed on the vehicles, thus saving weight and reducing the complexity of service and manufacture. Such networks offer the potential of new and unforeseen vehicle functionality.

SUMMARY OF THE INVENTION

It is an object of the invention to provide a vehicle intercom system.

It is another object of the invention to implement a vehicle intercom system which does not add to the physical complexity of the vehicle's electrical systems.

It is another object of the invention to implement an intercom system over a controller area network.

The invention provides an intercom system for communication between different areas of a vehicle. The intercom system comprises a bus for carrying data packets, the data packets including a priority indicator, a function identifier, a source identifier and a standard length data segment. A plurality of processor controlled modules are in communication with the bus, each of the processor controlled modules having a unique source identifier. Each of the processor controlled modules is also connected to the bus for receiving and interpreting data packets carried on the bus and for formatting and transmitting data packets over the bus. First and second intercom interfaces are positioned at mutually remote locations on the vehicle, the first and second intercom modules being further connected to first and second processor controlled modules. The first and second processor controlled modules further include signal processors for converting analog signals from the intercom interfaces to digital signals, bundling the digital signals into data packets and transmitting the data packets over the bus, and for recovering data packets having a function indication of an audio signal, converting data from the recovered data packets to an analog signal and applying the analog signal to the intercom interfaces.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
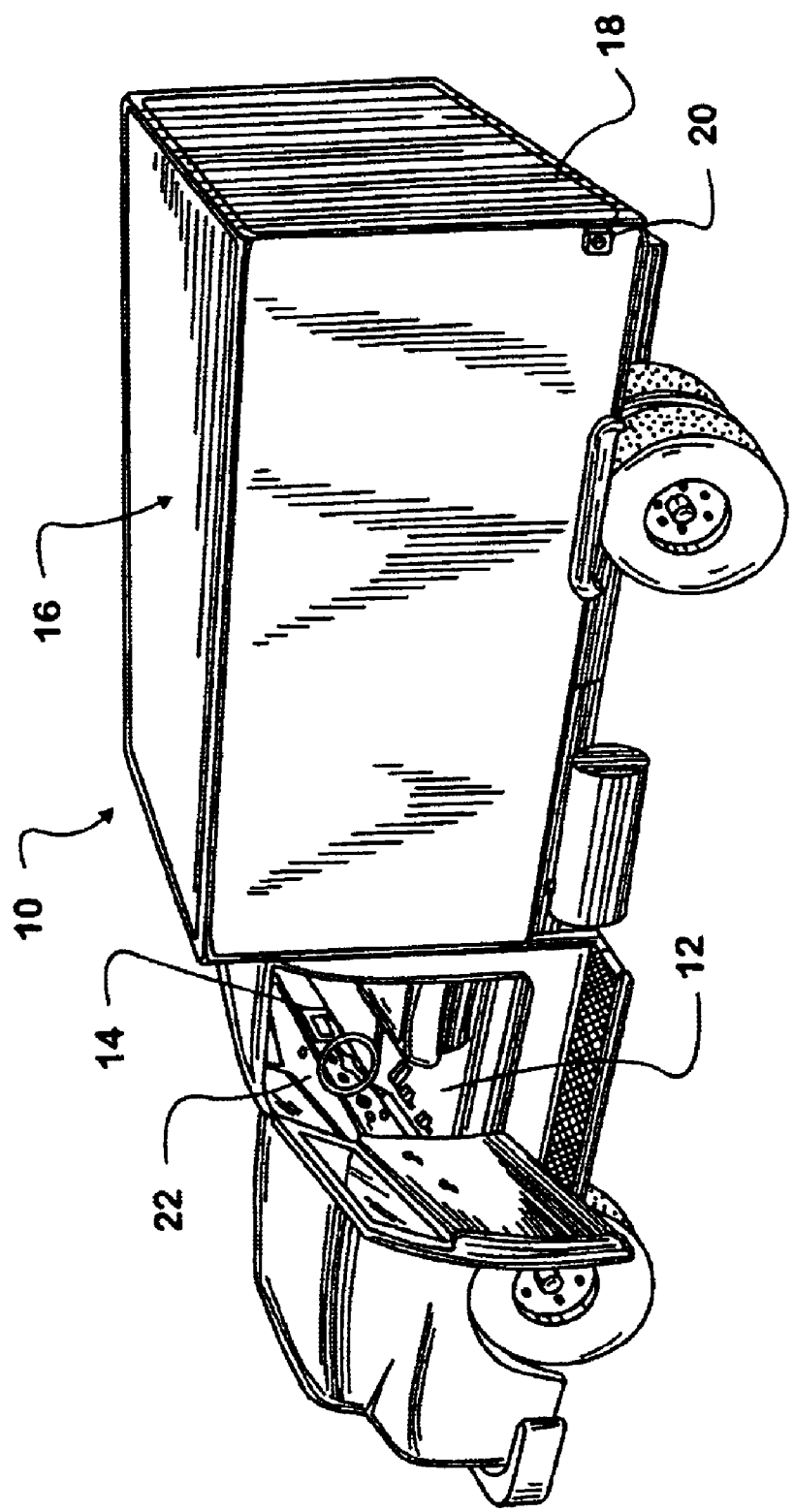
FIG. 1 is a perspective view of a medium duty truck illustrating the positioning of two intercom units of an intercom system on the truck.

FIG. 1 illustrates in perspective view a medium duty truck 10. Truck 10 includes a forward operator's cabin 12 and a rear utility section 16 which is depicted as a conventional cargo box, but which may be tow gear for a wrecker, compartmentalized garbage handling equipment, or other things. Mounted to exterior 18 of truck 10 is an intercom interface unit 20. Another intercom interface unit 14, possibly incorporated in a vehicle audio entertainment system, is located on dash 22 of forward operator's cabin 12. An individual located in forward operator's cabin 12 may converse with an individual located near the rear of truck 10 over the intercom interface units 14 and 22.

Figure 2:
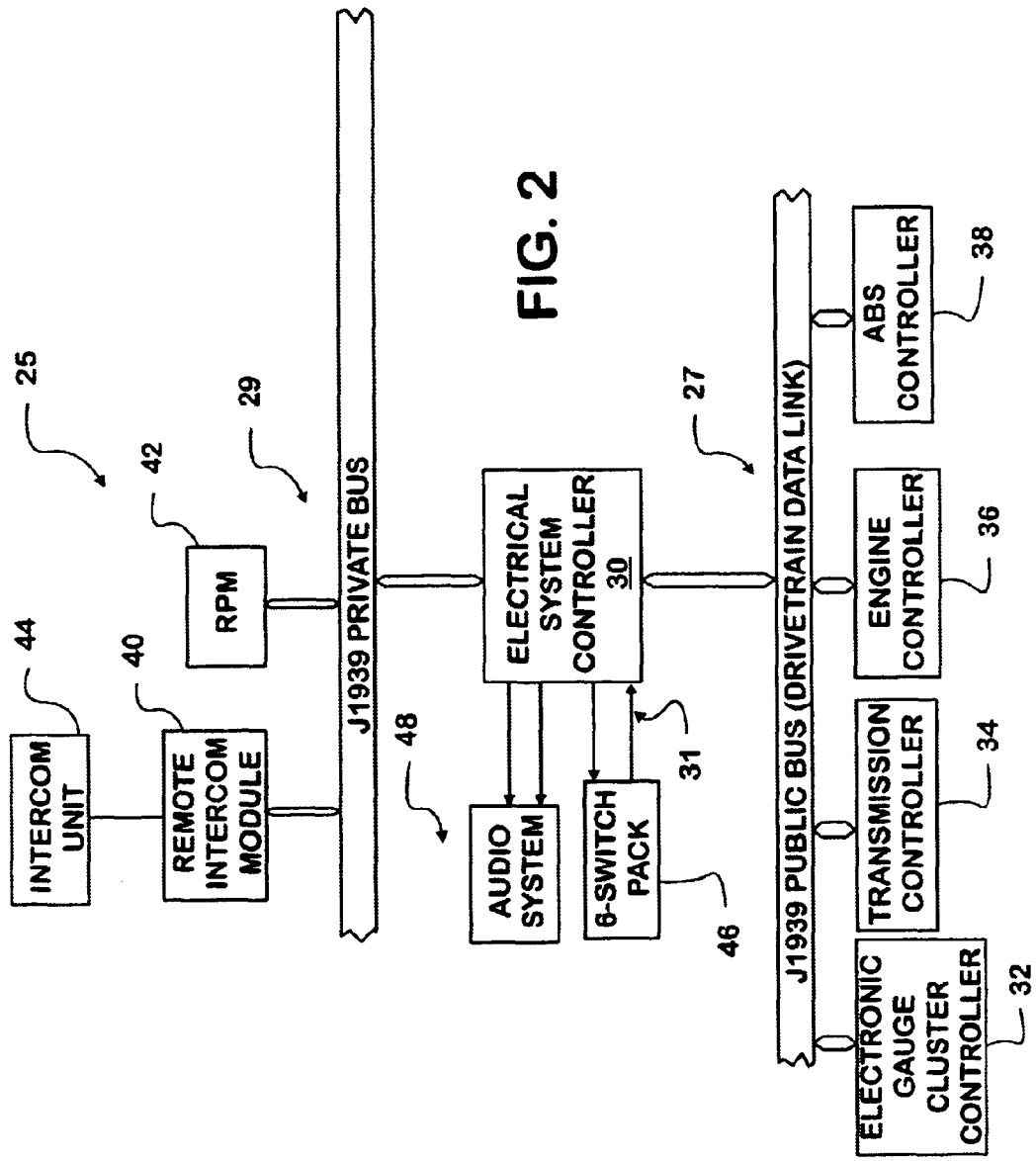
FIG. 2 is a block diagram of a vehicle controller area network used to implement the invention.

Referring now to FIG. 2, tractor 12 includes a electrical control system 25 based on an electrical system controller (ESC) 30 and three distinct networks including a first CAN network 27 based on the SAE J1939 standard and using the publicly defined message protocols to communicate with several drive train component controllers. The drive train component controllers include an electronic gauge cluster controller 32, an automatic transmission controller 34, an engine controller 36 and an anti-lock brake system controller (ABS) 38. The several controllers 30, 32, 34, 36 and 38 are also nodes of the first CAN network 27. A second CAN network 29 based on the J1939 standard uses manufacturer defined message codes and provides the data network over which the intercom system of the present invention is preferably implemented. Among nodes which are attached to the second CAN network 29 are a remote intercom module 40, a remote power module 42 and the electrical system controller 30. An intercom unit 44 is connected to remote intercom module 40. Finally the vehicle may also include a low speed SAE J1708 compatible network 31 over which electrical system controller 30 can interrogate the status of a plurality of switches in a switch pack 46. Electrical system controller directly handles a vehicle audio system 48 which in a preferred embodiment of the invention can serve, with the addition of a microphone, as an intercom station for the operator's cabin.

Figure 3:
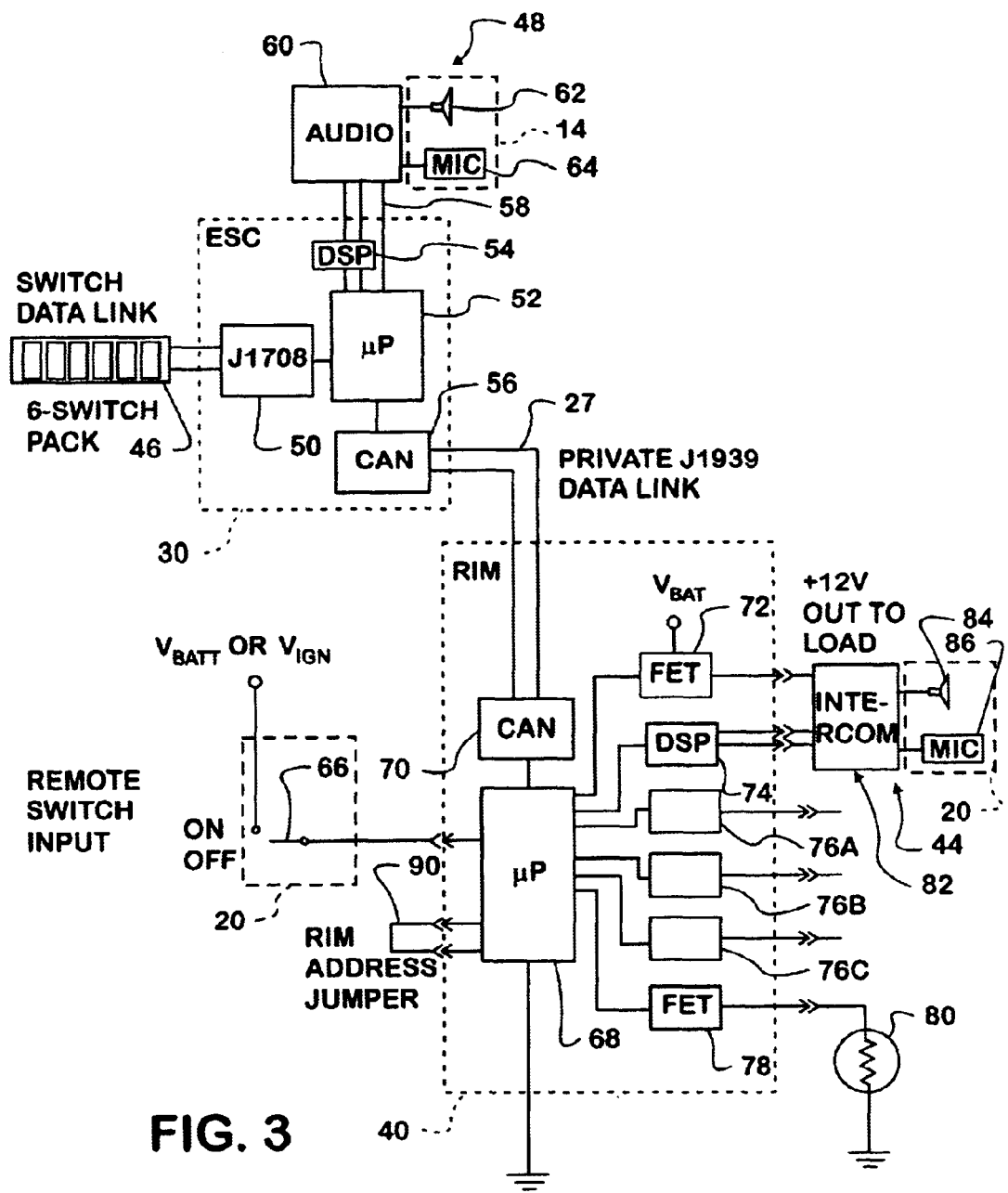
FIG. 3 is a high level circuit schematic of the intercom system.

FIG. 3 is a high level circuit schematic of the components of the intercom system. Electrical system controller 30 is modified for operation as a base for an intercom station by addition of connections to an audio system 60. If digital to analog and analog to digital conversion of signals from audio system 60 is required it is executed by a digital signal processor 54 connected between ESC microprocessor 52 and audio system 60. Audio system 60 is connected to drive a loudspeaker 62 which is part of the accessible intercom station or interface 14. Audio system 60 is further connected to a microphone 64 which is also part of station 14. Audio system 60 is also connected to a mute line 58 from microprocessor 52 which cuts off sound reproduction from sources other than DSP 54. In this way operation of an entertainment system may be interrupted if the intercom is in use. The intercom system may be activated by a switch from switch pack 46 which is connected to a J1708 protocol communications interface circuit 50 in ESC 30. Interface circuit 50 may be interrogated by microprocessor 52 for the status of each of the switches in switch pack 46. ESC 30 includes a CAN interface circuit 56 which provides conventional mailbox and buffering functions, as well as transceiver and memory management functions, all of which are well understood in the art. The voice data packets to be transmitted on data bus 29 and those received off of data bus 29 are handled by the CAN interface circuit 56. The packets include a priority indication, an arbitrary, unique header associated with voice data and a fixed length segment of digitized voice data. Packets will be transmitted in order and, since no switching for routing of the packets is required, the packets may be played in the order received without loss of intelligence. Intelligibility can be preserved at fairly low resolution to reduce bandwidth requirements on the network. The additional loading on the network represented by full duplex voice transmission should remain under 10% of available capacity. Since other data communications requirements of secondary or non-drive train CAN networks typically represent a load of under 10% of available capacity, the total traffic load is such that minimal buffering normally prevents gaps in the voice message.

Typically vehicle 10 is provided with two intercom stations. The second intercom station is managed by a remote intercom module 40 which communicates with electrical system controller 30 over private data link (J1939 bus) 29. Remote intercom module 40 (RIM) includes a CAN interface circuit 70 which is connected to data link 29 and which handles data communication. CAN interface circuit 70 is connected to a microprocessor 68 which identifies messages received over data link 27 for action, particularly voice data messages. Remote intercom module 40 may be connected to a remote input switch 66, which is part of the intercom station interface 20. Switch 66 may be used to activate a microphone 86 in the station interface 20 or for turning the remote intercom module 40 on.

CAN nodes do not have addresses and accordingly a RIM 40 does not require an address. RIM address jumper 90 connected to microprocessor 68 is accordingly closed. Microprocessor 68 is connected to a series of subsidiary devices within RIM 40 including a series of FETs 76A–76C. FET 78 may be used to activate a light 80 indicating that microphone 86 is active. FET 72 is connected to microprocessor 68 for powering intercom station base unit 82. Base unit 82 is in turn connected to a microphone 84 and a loud speaker 86, which form part of the intercom station interface 20. A digital signal processor 74 is connected between intercom station base unit 82 and microprocessor 68. DSP 74 is one possible facility for provided bi-directional analog to digital or digital to analog conversion.

The present invention enables a vehicle operator to communicate by voice with an individual outside of the vehicle or located in another part of the same vehicle. The intercom stations are linked by an existing CAN network and require only an extension of the data link cable to the desired location of the station. The resulting intercom system exhibits minimal physical complexity and high adaptability.

While the invention is shown in only one of its forms, it is not thus limited but is susceptible to various changes and modifications without departing from the spirit and scope of the invention.

What is claimed is:

1. An intercom system providing communication between points on a vehicle, the intercom system comprising:

a bus for carrying data packets, the data packets including a priority indicator, a function identifier, a source identifier and a standard length data segment;

a plurality of processor controlled modules in communication with the bus, each of the processor controlled modules having a unique source identifier and each processor controlled module being connected to the bus for receiving and interpreting data packets carried on the bus and for formatting and transmitting data packets over the bus;

first and second intercom interfaces positioned at mutually remote locations on the vehicle, the first and second intercom modules being further connected to first and second processor controlled modules; and the first and second processor controlled modules further including signal processors for bundling signals sourced by the intercom interfaces into data packets and transmitting the data packets over the bus, and for recovering data packets having a function indication of an audio signal.

2. An intercom system as claimed in claim 1, wherein the bus is a J1939 compliant bus and the data packets J1939 proprietary signals.

3. An intercom system as claimed in claim 2, the bus supporting substantially full duplex voice communication between intercom units.

4. An intercom system as claimed in claim 3, wherein the first processor controlled module is an electrical system controller and the first intercom interface is implemented using a vehicle audio system inside a vehicle cabin.

5. An intercom system as claimed in claim 4, wherein the second processor controlled module is located on the outside of the vehicle.

6. An intercom system as claimed in claim 5, further comprising:

means responsive to activation of the second intercom interface for muting reproduction of extraneous sounds vehicle audio system.

7. A vehicle comprising:

an operator cabin;

a first intercom interface installed in the operator cabin;

a remote second intercom interface;

a controller area network;

an electrical system controller connected to the controller area network and to the first intercom interface, the electrical system controller including a signal processors for bundling audio signals into data packets and transmitting the data packets over the bus, and for recovering data packets having a function indication of an audio signal not sourced from the electrical system controller and applying the audio signal to the first intercom interface; and a processor controlled module connected to the controller area network and to the second intercom interface, the second processor controlled module including a signal processor for bundling an audio signal sourced from the second intercom interface into data packets and transmitting the data packets over the bus, and for recovering data packets having a function indication of an audio signal sourced from the electrical system controller and applying the analog signal to the second intercom interface.

8. A vehicle as claimed in claim 7, further comprising:

an intercom system with substantially full duplex voice communication between the first and second intercom interfaces over the controller area network.

9. A vehicle as claimed in claim 8, further comprising:

means responsive to activation of the second intercom interface for muting reproduction of extraneous sounds by a vehicle audio system.

* * * * *